N. CRANE.
TRACTOR ATTACHMENT FOR MOTOR CARS.
APPLICATION FILED JULY 13, 1917.
1,276,035.
Patented Aug. 20, 1918.
2 SHEETS—SHEET 1.
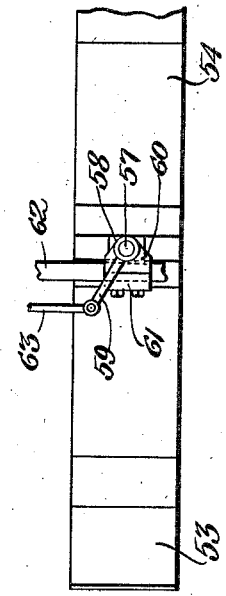
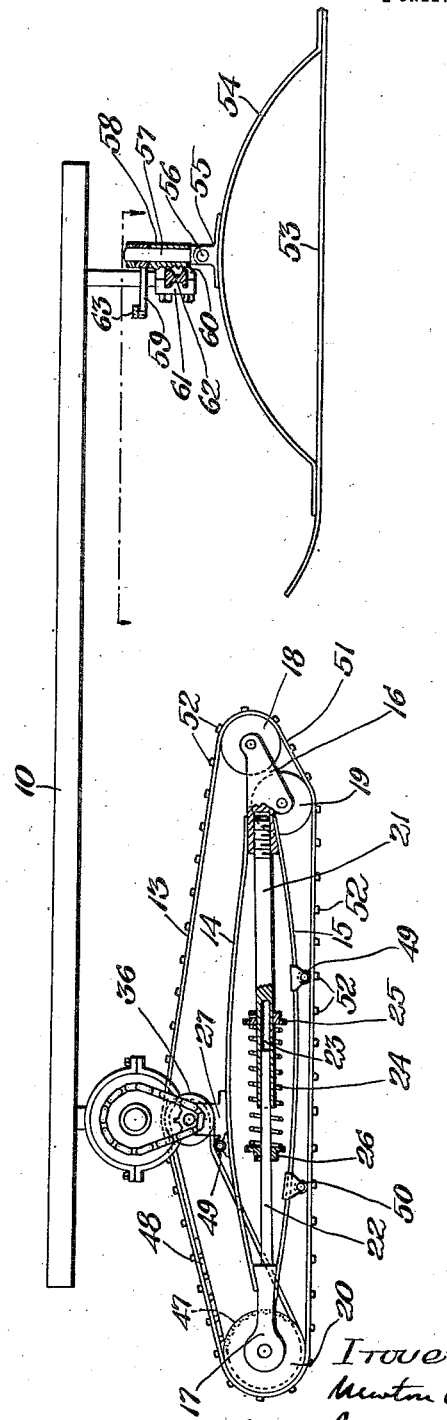

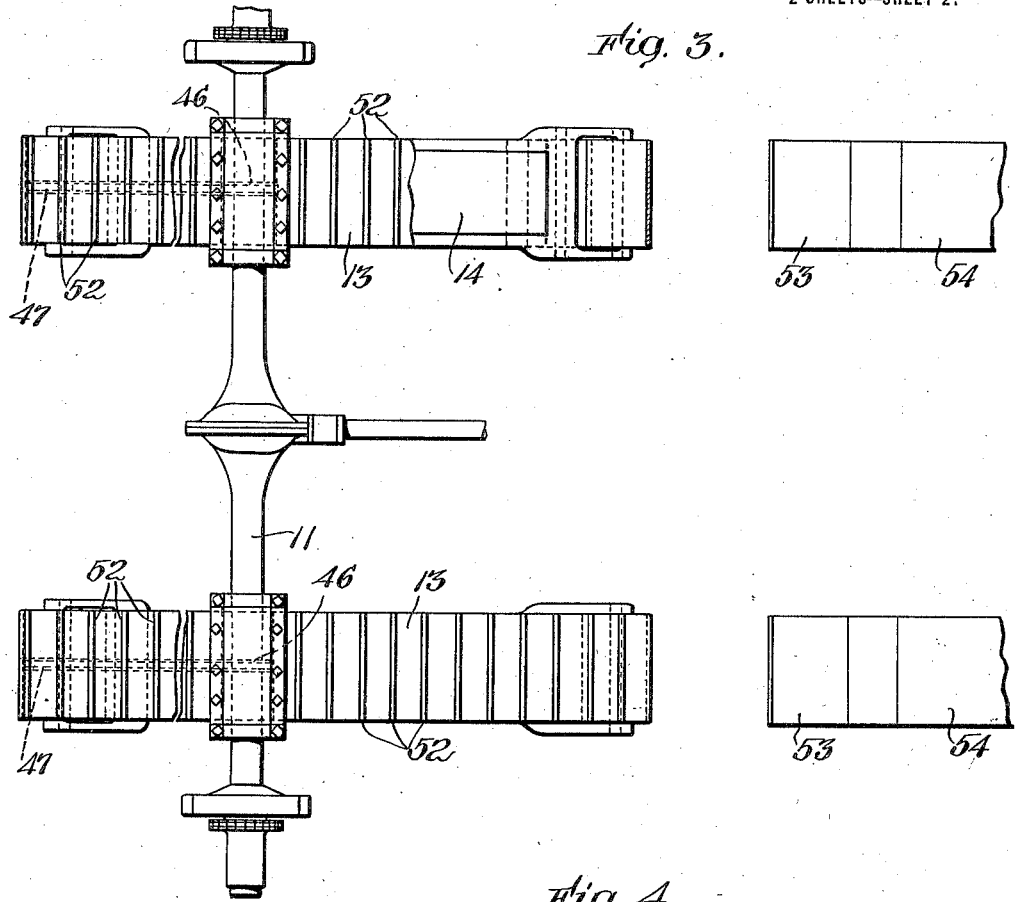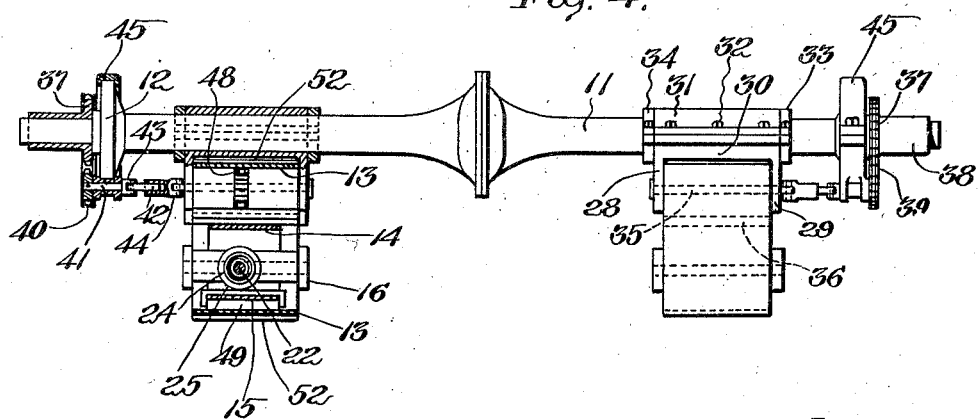

UNITED STATES PATENT OFFICE.

NEWTON CRANE, OF BOSTON, MASSACHUSETTS.

TRACTOR ATTACHMENT FOR MOTOR-CARS.

1,276,035.  Specification of Letters Patent.  Patented Aug. 20, 1918.

Application filed July 13, 1917. Serial No. 180,314.

*To all whom it may concern:*

Be it known that I, NEWTON CRANE, citizen of the United States, residing at Boston, in the county of Suffolk and State of Massachusetts, have invented new and useful Improvements in Tractor Attachments for Motor-Cars, of which the following is a specification.

The present invention relates to an attachment designed and adapted to be applied to existing types of automobiles and motor cars, by which I mean principally cars, either pleasure vehicles or freight trucks, which are supported on the ground by means of wheels. The object of the invention is to provide a tractor element to take the place of the driving wheels of such a vehicle in order principally to adapt the vehicle to service as a sleigh or sled, the forward wheels being also removed and their places supplied by runners. The substituted tractor element, however, may also be used without removal of the forward wheels, as in case it is required to apply especially great tractive power under conditions when it is not advisable that the forward part of the vehicle should slide upon runners rather than roll upon wheels. The invention consists therefore in the principles underlying, and the elements embodied in, a tractor device capable of being produced and marketed independently of an automobile and adapted to be readily applied to such automobile when need for its use arises, substantially as shown and described in detail in the following specification in connection with the drawings.

In the drawings Figure 1 is a side elevation with parts broken away of an embodiment of my tractor element applied to an automobile.

Fig. 2 is a plan view of the steering means for the forward runners.

Fig. 3 is a plan view of the assembly between the rear axle of the automobile and the tractor elements applied thereto.

Fig. 4 is a rear elevation of the same with parts broken away.

The same reference characters indicate the same parts in all the figures.

In the drawings 10 represents a part of the frame of an automobile and may be considered as generally typical of and representing any commercial automobile body. 11 (Figs. 3 and 4) represents the rear axle housing in which is contained the rear axle or the sections of the rear axle such as in existing types of commercial motor car carries on its ends the rear wheels. The particular embodiment of my invention herein shown is designed for application to a certain well known type of motor car which is in extensive use at the present day. In such car the rear axle is the driving shaft; on its ends are mounted the rear wheels, and it is contained in a housing. In applying my tractor attachment the rear wheels are removed from the axle ends and the tractors are mounted on the axle housing within the flanges 12 on the ends of such housing, and also inside the points at which the springs supporting the automobile body are secured to the housing. The tractors are thus placed in order first to enable them to be driven from the driving axle in a manner which I will presently describe, and second to place them at approximately the same distance apart as the runners of the ordinary sled or sleigh. On account of the common practice of double teaming in country districts where the snowfall is abundant, the roads broken through the snow become deeply rutted in the paths traveled by the draft animals, and it is desirable on all accounts that the runners of a sled should travel in these ruts. The placement of my tractors in the manner above described enables them to travel in the same ruts.

Each tractor is a self-contained unit comprising a frame and an endless tractor belt 13. The frame is preferably resilient vertically so as to make a yielding cushion support for the vehicle and is at the same time extensible longitudinally, and is entirely surrounded by the belt, wherefore the distortion given to the frame when it yields under load applies force to the belt keeping the latter taut; and the strength of the belt tends to resist collapsing of the frame under the load. Furthermore the frame has sufficient lateral rigidity to maintain its form and position against side thrusts, but is flexible to a certain degree to enable the tread portion of the belt to accommodate itself to an irregular ground surface. These characteristics of the frame are secured by constructing the same of an upper spring member 14, a lower spring member 15 and brackets 16 and 17 which are connectors for the ends of the spring members and are also holders for guide wheels or rolls 18, 19, and 20, around which the tractor belt passes. The spring members are strips of flexible resilient and tough material preferably steel, although other metal or even non-metallic material may be used under proper conditions. These spring strips are rigidly secured at their ends to the brackets 16 and 17 whereby such ends are immovably connected together, but they are separated and spread apart at their intermediate portions, the upper spring being bulged upwardly above a straight line connecting its ends and the lower spring being bulged downwardly below the straight line connecting its ends. Said strips are so thin in a vertical direction that they are very flexible and resilient in that direction, but are so wide laterally, as appears from Figs. 3 and 4, that they are rigid enough to resist strongly distortion in any manner under lateral thrust applied to any part of the tractor. Preferably, however, the width of the strips is less than the width of the belt and guide rolls to permit such warping or bending as may be necessary to accommodate the belt to uneven ground. In addition I have provided a supplemental means tending to shorten the frame so as to tend to spread these spring strips apart and thereby increase the resistance of the frame to collapse under load. This means comprises a telescopic bar consisting of two members or sections 21 and 22, the former of which has a socket 23 receiving the latter, and a helical spring 24 surrounding said bar and attached to collars 25 and 26 fixed to the sections 21 and 22 respectively. The forward end of one of these sections is secured to the bracket 16 and the rear end of the other section is secured to the bracket 17, thus in effect connecting the opposite ends of the spring 24 to these brackets, whence the retractile effort of the spring tends to draw such brackets together. The section 21 is screw threaded into the bracket 16 and is thereby adjustable to vary the stiffness of the spring frame making it proportional to the load.

Secured to the upper spring 14 of the frame in rear of the point midway between the ends of the tractor, is a standard 27 having arms 28 and 29 spaced apart widely enough to admit the tractor belt, and carrying at their upper end the lower half 30 of a bearing box which receives and fits the under side of the housing 11. The complemental part or cap 31 of this box is placed over the axle housing and is secured to the part 30 by bolts 32 passing through flanges with which these parts are provided. By this means the tractor frames are revolubly secured to the axle. I also provide collars 33 and 34 formed as rings cut in two on a diameter, which fit the housing and are clamped thereto at opposite ends of the bearing 30, 31, fixing the location of the tractor at the desired point on the housing without diminishing its freedom to pivot about the housing, such pivoting being necessary to enable the tractor to incline in conformity with the ground.

Below the bearing member an axle rod 35 is mounted in the standard 27 passing between the side members thereof, and on this axle rod is fixed a driving roll 36 over which the tractor belt 13 passes. This driving roll is driven in the following manner. On the exposed axle end, taking the place of the removed rear wheel is a sprocket wheel 37 having a long sleeve-like hub 38 to protect the axle, and being secured tightly enough to be driven positively thereby. This sprocket wheel drives a chain 39 which passes around a second sprocket wheel 40 on a short counter shaft 41, which is connected by means of a telescopic shaft section 42 and two universal joints 43 and 44 with the axle rod 35. The shaft section 41 rotates in a bearing carried by a clamp ring 45 which is placed upon and secured to the flange 12 of the housing, said ring 45 being made of two parts which fit around the flange and are secured together by bolts and lugs. It is secured firmly enough so as not to be rotatable about said flange. By this means it is a simple matter to mount and dismount the tractor element and the power transmission means upon and from the vehicle. This part of my invention comprises not only the tractor element itself, but also the power transmission mechanism and the means for mounting the same in a demountable manner upon the automobile body in such manner that the tractor may be driven by the existing power equipment of the vehicle. For this purpose the shaft housing is considered to be a part of the vehicle body, and the rear axle is the delivery element of the power plant with which the automobile is furnished.

The driving impluse is applied to the tractor belt not only by the roll 36, but also in part by the rear roll 20, which is at once both a guide roll and a driving roll. Associated with the roll 36 is a sprocket 46 and with the roll 20 a sprocket 47. All these sprockets are associated with and connected by a chain 48. Preferably the sprockets are placed midway between the ends of the rolls, as indicated in Figs. 3 and 4, in order to apply the draft centrally to the roll 20, the rolls being formed in two parts for this purpose, assembled together with the interposed sprockets, and the teeth of the sprockets are sunk within the peripheral surface of the associated rolls in order not to injure the belt. A guide roll 49 is provided on a bracket mounted on the upper spring 14 of the frame in order to take up and pay out slack in the chain under different conditions of distortion of the spring frame. When the frame is somewhat collapsed under a heavy load, the linear distance between the rolls 36 and 20 is diminished, and in such conditions the guide sprocket 48 is relatively raised and caused to bend the lower stretch of the chain; while when the frame expands upwardly with diminution of the load and the roll 36 is raised, such roll is removed farther from the roll 20 and the bend in the lower stretch of the chain becomes less pronounced. Said lower stretch passes through passageways provided for it in the members of the frame, and at one side of the rod 22.

When in operation the lower stretch of the belt, running from the roll 19 to the roll 20, rests upon the ground and is the base of that part of the vehicle. I would here state that the term "ground" as used in this specification and in the following claims is intended to include anything on which the tractor may rest, including not only the bare earth but a layer of snow or ice on the earth and the frozen surface of a body of water. When the ground is of yielding nature, as a layer of soft snow, sand, mud, etc., or is solid but uneven, there would be a tendency for the flexible belt to be bent upwardly between the supporting rolls, and in order to counteract this tendency and maintain the belt more nearly straight in this part, I provide bearing rolls 49 and 50, which are mounted in brackets on the lower spring 15 and bear against the belt substantially as shown in Fig. 1. These rolls transmit a part of the load to intermediate points in the lower stretch of the belt and avoid concentration of the entire load on the rolls 19 and 20.

It will be noted that the foremost guide roll 18 is in front of and at a higher level than the roll 19. This arrangement of the rolls provides in the belt an upwardly and forwardly inclined stretch 51, which enables the tractor easily to surmount obstacles in its path, such as a stone or hummock of ice or earth, or a sudden upward slope of the surface, such as a snowdrift.

Lightness of construction is a feature of great importance in a structure which may be required to rest and travel upon soft snow, and the means for obtaining this condition is a feature of the present invention. A part of this means comprises the frame structure already described and another element is embodied in the tractor belt 13. For the purpose indicated, such belt is so made as to be light and at the same time strong and having high frictional power. I prefer to make the same of frictioned textile fabric having a rubber outer face, as this material has the desired qualities; and in order to increase its tractive power I may form upon its outer face transverse ribs 52 which will sink into soft snow and earth. By preference these ribs are parallel to the axes of the rolls in order that they need not be bent in passing around such rolls. I wish to make it plain that the foregoing description of the belt is not intended as a limitation of the invention to a belt of that particular construction, for I may use other materials than rubber coated fabric including leather belting or a metallic link structure, and I may have the tread surface provided with any suitable sort of armor and studs or other projections for biting into soft ground. Therefore, and I desire to emphasize this fact, the characterization in this specification and in the following claims of the tractor element 13 as a belt is not intended to limit said element in any manner as to its construction, but on the contrary the term "belt" is intended to include any flexible traveling medium adapted to perform the functions of the belt here shown, whether the same is made of material flexible in itself, or is made flexible by pivots or hinges between sections of rigid material or construction.

For completing the conversion of the motor vehicle equipped with the tractor elements herein described into a sleigh I provide forward runners 53 which may be substituted for the forward wheels of the motor car. Such runners may be of any construction, like any of the commonly used forms of sled or sleigh runners, of whatever construction, and I prefer to employ the construction fully illustrated, claimed, and described in my co-pending application Serial No. 180,312, filed July 13, 1917. Such construction of runner comprises a bottom or base member, substantially flat but with upturned ends to over-ride obstructions, and a spring superstructure 54 made from a strip of springy metal rigidly secured at its ends to the base and curved upwardly between its ends, carrying a lug 55 at an elevated point connected by a pivot 56 with a pin 57 mounted in a bearing sleeve 58 and carrying an arm 59. The bearing sleeve is formed as part of a bracket 60 equipped with a detachable clamp 61, said bracket and clamp adapted to embrace and be secured to the forward axle 62 of the car, the forward wheels being removed. By preference these brackets are mounted inside the locations of the wheels so that the forward runners will be in longitudinal alinement with the tractors, as appears from Fig. 3, to secure the benefits of the spacing of the latter already set forth. The runners as thus constructed are yielding and resilient vertically, and provide a spring support for the forward part of the vehicle, because their elements are made of springy material the thickness of which is proportioned, with respect to the width thereof, to secure the desired extent of yielding under a given load. At the same time the elements of these runners are made relatively very wide to secure great lateral stiffness resistant to distortion under side thrusts, as well as to secure extended bearing surface to prevent sinking in soft ground.

Each of the forward runners has a swivel or knuckle pin 57 equipped with an arm 59 as above described, and the two arms are connected by a cross rod 63 which is connected to and engaged with the steering wheel or equivalent device of the vehicle, in a manner similar to that in which the forward wheels of motor cars are commonly connected with the steering wheels of such cars.

What I claim and desire to secure by Letters Patent is:

1. A tractor attachment for automobiles comprising a frame, a bearing sleeve secured to said frame and adapted to be mounted on the housing of an automobile axle with freedom to turn about the same, guiding rolls mounted at the opposite ends of said frame, a tractor belt passing around said rolls and under the frame, having a width at least substantially as great as that of the frame and forming the sole and entire ground support for said tractor attachment, and means for driving said belt.

2. A tractor attachment for automobiles comprising a frame, a bearing sleeve secured to said frame and adapted to be mounted on the housing of an automobile axle with freedom to turn about the same, stops adapted to be fixed on said housing at each side of the bearing to prevent shifting of the frame along the housing, guiding rolls mounted at the opposite ends of said frame, a tractor belt passing around said rolls and the frame, having a width at least substantially as great as that of the frame and forming the sole and entire ground support for said tractor attachment, and means for driving said belt.

3. A tractor attachment for automobiles comprising a frame, guiding rolls at opposite ends of said frame, a flexible tractor belt passing around said rolls and having sufficient width to enable its lower stretch to form the entire ground support of the attachment, attaching means mounted on the upper part of the frame between its ends adapted to connect the same rotatably on the axle housing of an automobile, a sprocket associated with one of said rolls between the ends thereof, a second sprocket mounted on the frame near said attaching means and beneath the upper stretch of the belt, a driving chain passing around said sprockets, and means at one side of the upper stretch of the belt for driving the second-named sprocket.

4. The combination with an automobile having a rear axle and a housing for said axle, of a tractor attachment comprising a frame, means for attaching said frame swivelly to said housing at a point between the ends of the frame so that the latter may swing in a vertical longitudinal plane, rolls mounted upon the ends of said frame, and a flexible tractor belt passing around said rolls and beneath said housing, a roll mounted on the frame under the upper stretch of said belt close to the point of attachment of the tractor to the housing, a flexible power transmission element passing over said roll to the roll at one end of the frame and being contained wholly between the edges of the belt, and power transmission means from the axle to said supporting roll, a part of said means crossing the outer edge of the upper stretch of the belt.

5. The combination with an automobile having a driving axle and a housing therefor, of a tractor comprising a frame, guide rolls at opposite ends of said frame, one of which is a driving roll, a tractor belt passing around said rolls and surrounding the frame, being of a width sufficient to support the tractor attachment and the load borne thereby on soft snow, means for connecting said tractor to said housing in a manner permitting oscillation in a vertical longitudinal plane, a roll supporting the upper stretch of said belt mounted on the frame close to the housing, a shaft connected with said roll, a sprocket on said shaft, a sprocket mounted on the axle, a chain passing around said sprockets and crossing the outer edge of the upper stretch of the belt, and a flexible power transmission element passing around said roll and the aforesaid driving roll and contained entirely between the edges of the belt for driving the latter.

6. A tractor attachment for automobiles comprising a frame, driving and guiding rolls mounted on said frame, a flexible belt passing around said rolls, attaching means mounted on said frame adapted to be connected with part of an automobile body, a shaft connected with one of said rolls, a sprocket gear attached to said shaft, a second sprocket gear adapted to be mounted upon the driving axle of the vehicle, a chain connecting said sprocket gears, a bearing in which said shaft adjacent to the first sprocket gear is adapted to turn, and clamping means for detachably mounting said bearing on the automobile in operating relation to the second sprocket gear.

7. A tractor attachment comprising in combination a frame, guiding and driving rolls mounted on said frame, complemental clamping members one of which is fixed upon the frame and the other is detachably connected therewith, a flexible belt passing around said rolls, a flexible telescopic shaft connected to said driving roll, a bearing for the end of said shaft remote from said roll, a gear on said shaft end, and clamping means connected with said bearing.

8. A tractor adapted to be mounted upon an automobile comprising a frame having guiding means, a belt passing around said guiding means and a clamp attached to said frame adapted for detachable connection to an automobile, the frame comprising longitudinal spring strips and belt guides to which the ends of said strips are connected, said clamping means being attached to one of said strips at an intermediate point, and the strips being of less width than the belt whereby to permit yieldingly resisted distortion of the belt to adapt itself to irregular ground surfaces.

9. A tractor comprising separated guide members, leaf springs connected at their ends to opposite sides of said guide members and spread apart at their intermediate portions, said springs being under permanent set resisting approach of such intermediate members toward one another, a retractile spring connected to said members tending to draw them together, and a belt passing around said members.

10. A tractor element comprising a frame, belt-guiding means on the ends of said frame and a belt surrounding said guiding means, the frame being composed of longitudinally extending spring strips rigidly connected at their ends and separated and bulged apart between their ends, and a retractile spring arranged between the spring strips to apply force tending to shorten said frame.

11. A tractor comprising a frame consisting of guide roll carriers, guide rolls carried by said carriers, spring strips connected at their opposite ends to said carriers and bulged away from one another between their ends, a telescopic rod between said springs connected at opposite ends to the carriers, a retractile spring connected to the members of said rod, and exerting force tending to shorten the rod, a bracket for mounting the tractor connected to one of said springs, a roll supported by said bracket, and a flexible tractor belt surrounding all of said rolls and said springs.

12. A tractor element comprising a frame, belt-guiding means on the ends of said frame and a belt surrounding said guiding means, the frame being composed of longitudinally extending spring strips rigidly connected at their ends and separated and bulged apart between their ends, and a retractile spring arranged between the spring strips to apply force tending to shorten said frame, and adjusting means for varying the tension of said spring whereby to adjust the frame to various loads.

13. A tractor attachement comprising a frame composed of flat spring strips one above the other, brackets to which the ends of said strips are connected, and rolls mounted on said brackets, said strips being permanently spread apart between their ends, a tractor belt surrounding said frame and running upon said rolls, the lower stretch of the belt forming the ground support for the tractor, a standard having arms on either side of the upper stretch of the belt, a bearing box connected with said arms adapted to fit the axle housing of an automobile, and a complemental cap detachably connected to said bearing box to complete a swivel attachment by which the tractor may be detachably mounted upon such housing.

14. A tractor attachment for automobiles comprising a frame, guide rolls on said frame, a tractor belt surrounding said frame having a bottom stretch which forms the entire ground support for the tractor, a demountable connection for attaching said frame to an automobile, and an external wheel connected to one of said rolls for receiving power from the power plant of the automobile, said frame being composed essentially of thin wide strips and holders for said rolls to which said strips are connected at their ends, the strips being spread apart intermediate their ends and said connection being attached to one of them.

15. A tractor attachment according to claim 14 distinguished by the fact that the width of said strips is less than the width of the tractor belt and the location of the strips is between the vertical planes in which the opposite edges of the belt run.

16. A tractor attachment according to claim 14 distinguished by the fact that said strips are sufficiently thin to be springy and thereby afford resilience vertically, and at the same time are sufficiently wide to afford lateral stiffness resisting lateral forces which tend to distort the tractor.

In testimony whereof I have affixed my signature.

NEWTON CRANE.